United States Patent
Fukushima et al.

(10) Patent No.: US 6,171,192 B1
(45) Date of Patent: *Jan. 9, 2001

(54) FLYWHEEL ASSEMBLY EMPLOYING A DAMPER MECHANISM HAVING AN ANNULAR CHAMBER FILLED WITH A DRY LUBRICANT

(75) Inventors: Hirotaka Fukushima, Hirakata; Kazuhiro Yamashita, Neyagawa, both of (JP)

(73) Assignee: Exedy Corporation, Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/804,261

(22) Filed: Feb. 21, 1997

(30) Foreign Application Priority Data

| Feb. 29, 1996 | (JP) | ..................................... 8-043526 |
| May 16, 1996 | (JP) | ..................................... 8-121857 |
| Jun. 25, 1996 | (JP) | ..................................... 8-164664 |

(51) Int. Cl.[7] ..................................................... F16D 1/24
(52) U.S. Cl. .................................. 464/7; 464/84; 464/101
(58) Field of Search .................................... 464/81, 7, 84, 464/51, 54, 68, 100, 101; 192/207; 74/574

(56) References Cited

U.S. PATENT DOCUMENTS

| 3,681,939 | * | 8/1972 | Timtner et al. ........................ 464/84 |
| 4,019,345 | * | 4/1977 | Fukuda . | |
| 4,662,267 | * | 5/1987 | Kaku et al. . | |
| 4,997,295 | * | 3/1991 | Saitou . | |
| 5,273,372 | * | 12/1993 | Friedmann et al. ............... 464/68 X |
| 5,325,732 | * | 7/1994 | Vogel . | |
| 5,551,318 | * | 9/1996 | Fukushima .......................... 464/101 |
| 5,562,541 | * | 10/1996 | Fukushima ............................ 464/84 |
| 5,680,918 | * | 10/1997 | Reik et al. ......................... 464/68 X |
| 5,803,441 | * | 9/1998 | Yamamoto ............................ 464/84 |
| 5,868,232 | * | 2/1999 | Fukushima .......................... 192/208 |

FOREIGN PATENT DOCUMENTS 42 06 921   9/1992  (DE) .

OTHER PUBLICATIONS

Hildebrand, Feinmechanische Bauelement (Fine Mechanical Construction Elements) 1968 pp. 464–468.
Rompp Chemie Lexikon (ROMPP Chemical Dictionary) 1995, pp. 2838 & 5064.

* cited by examiner

Primary Examiner—Lynne H. Browne
Assistant Examiner—Greg Binda
(74) Attorney, Agent, or Firm—Shinjyu Global IP Counselors, LLP

(57) ABSTRACT

A viscous damper mechanism 5 includes first and second input plates 18 and 19, a driven member 30, a spring chamber 17 and a undulated plate spring 23. The spring chamber is formed between the first and second input plates 18 and 19 and the driven member 30. The undulated plate spring 23 is disposed in the spring chamber, and is operable to connect elastically the first and second input plates 18 and 19 to the driven member 30 in the rotation direction and damp a torsional vibration. The spring chamber 17 is filled and sealed with powder solid lubricant.

12 Claims, 6 Drawing Sheets

Fig. 4

| | Lubricity μ | Absorption | Adhesiveness | Grain Diameter μm/ Specific Gravity | Self-cohesion | Heat Resistance | Other Factors | |
|---|---|---|---|---|---|---|---|---|
| Molybdenum Disulfide MoS₂ | 0.006~0.25 | ○ | ⊙ | 0.5~10/4.8 | small | below 350°C | Can be used under high load conditions | ○ |
| Graphite C | 0.05~0.30 | △ | △ | 3.0~250/2.3 | small | below 550°C | Below grain diameter 3.0 μm, abrasive wear occurs | ○ |
| Tungsten Disulfide WS₂ | 0.05~0.28 | ○ | ○ | fine powder/7.4 | small | below 450°C | In humid air, μ increases | ○ |
| Boron Nitride BN | 0.20 | × | × | fine powder/2.3 | small | below 900°C | | △ |
| Graphite Fluoride (CF)n | 0.04~0.20 | △ | △ | fine powder/2.5 | small | below 400°C | | ○ |
| PTFE | 0.02~0.20 | × | × | 0.5~several μm/2.2 | cohesion tendancy | below 150°C | | × |

⊙ = Highly Desirable
○ = Desirable
△ = Acceptable
× = Undesirable

FLYWHEEL ASSEMBLY EMPLOYING A DAMPER MECHANISM HAVING AN ANNULAR CHAMBER FILLED WITH A DRY LUBRICANT

BACKGROUND OF THE INVENTION

A. Field of the Invention

The present invention relates to a damper mechanism and a flywheel assembly.

B. Description of the Background Art

In automotive vehicles, a damper mechanism is often included in a flywheel/clutch mechanism attached to the crankshaft of the automobile's engine, between the engine and a transmission for absorbing a torque variation produced by the engine. The damper mechanism may be disposed in either a clutch disk assembly or a flywheel of the flywheel clutch mechanism. The damper mechanism includes input and output members which can rotate relatively to each other, and also includes elastic members such as coil springs for restricting relative rotation of these members, and a friction generating mechanism which generates a friction to damp vibration when these members rotate relatively to each other.

For example, parts of a damper mechanism arranged between first and second flywheels of a flywheel assembly are disposed in a chamber filled with viscous fluid. Owing to lubrication by the viscous fluid, it reduces a friction between an elastic member and a support member and between other sliding portions at the friction generating mechanism or the like.

In the conventional damper mechanism described above, a film of the viscous fluid must be present between sliding portions of the elastic member and the support member, otherwise, wearing or abrasion occurs between the engaging sliding surfaces. When such a device sits unused for an extended period of time, gravity might cause such a film of viscous fluid to drain from some surfaces. Further, the viscous fluid may leak from the chamber, in which case a lubricity is further impaired.

In the damper mechanism, coil springs forming the damper mechanism require a circumferentially and axially large space due to their constructions. Therefore, it is difficult to arrange the damper mechanism of the above structure in a front wheel drive vehicle, in which an axial space is particularly restricted.

Japanese Laid-Open Patent Publication No. 6-174011 has disclosed a damper mechanism, in which an undulated or curved plate springs are used instead of coil springs for reducing a required space. Each undulated plate spring is formed of a plate member which has a constant width and a corrugated form. The undulated plate spring is formed of ring portions having open ends, and lever portions which connect the open ends of the ring portions for enabling a series operation of the ring portions. The paired lever portion extend in a diverging form from the common ring portion, and have a higher rigidity than the ring portion.

The undulated plate spring is arranged in an arc-shaped chamber defined by input and output members for transmitting a torque from the input member to the output member. When a torsional vibration is transmitted to the input member, the undulated plate spring is compressed in the rotation direction. Thereby, an open angle between the paired lever portions decreases, so that a bending moment is exerted on the ring portion. As a result, the ring portion and the lever portion elastically bend in the same direction around a fulcrum formed of a center (apex) of the ring. When the torsion angle increases, ends of each ring portion are brought into contact, and thereafter, the ring portion elastically bends around the fulcrum formed of the ends. An elastic energy is distributed and stored in the plurality of ring portions.

The lever portion has a higher rigidity than the ring portion, and has a uniform thickness. Therefore, the lever portion cannot store a sufficiently large elastic energy. As a torque transmitted to the damper mechanism increases, a relative torsion angle between the input and output members increases, so that the undulated plate spring is compressed to a larger extent. When a load larger than an ordinary torque is exerted on the undulated plate spring, an excessively large stress breaking the undulated plate spring may be produced at the bent plate spring.

SUMMARY OF THE INVENTION

An object of the invention is to improve a lubricity in a damper mechanism.

Another object of the invention is to increase the elastic energy storage capacity of the undulated plate spring.

A still another object of the invention is to reduce a stress of a undulated plate spring for preventing breakage.

In accordance with one aspect of the present invention, a damper mechanism includes an input member and an output member configured for limited relative rotary displacement with respect to the input member. A chamber housing is disposed between the input and output members and a first portion of the chamber housing is connected to the input member for rotation therewith. A damper mechanism is disposed in the chamber housing elastically connecting the input and output members for limited relative rotary displacement therebetween and damping torsional vibration therebetween. The damper mechanism includes an elastic member that elastically connects the input and output members. The elastic member further contacts at least one surface of the chamber housing thereby defining a hysteresis vibration dampening mechanism whereby, in response to relative rotary displacement between the input and output members, contact between the elastic member and the surface of the chamber housing generates friction. A powder solid lubricant is disposed in the chamber housing providing lubrication between the elastic member and the surface of the chamber housing to augment the operation of the hysteresis vibration dampening mechanism and also to reduce wear on other portions of the elastic member that may contact the chamber.

When a torsional vibration is supplied to the viscous damper mechanism, the input and output members cyclically rotate relatively to each other. In this operation, the powder solid lubricant lubricates sliding portions of the damper unit, so that a friction is suppressed. In particular, since the powder solid lubricant has good absorption or absorptive properties with respect to respective members and can keep a good adhesion force after absorption, a high lubricating effect can be achieved.

Further, when a relative rotation angle between the input and output members increases, the ring portions in the first row are brought into contact with each other and the ring portions in the second row are brought into contact with each other, so that relative rotation between the input and output members stops. Thus, the ring portions in both the rows function as a stop mechanism. As a result, the undulated plate spring is suppressed from receiving a load larger than a set or intended load, so that generation of a large stress is suppressed. In particular, the damper mechanism has a simplified structure because the undulated plate spring functions as the stop mechanism of the damper mechanism.

The foregoing and other objects, features, aspects and advantages of the present invention will become more apparent from the following detailed description, when taken in conjunction with the accompanying drawings.

BRIEF DESCRIPTION OF THE DRAWINGS

FIG. 4 is a chart showing a comparison of various characteristics of various dry lubricants which may be used in the annular chamber of the present invention;

DESCRIPTION OF THE PREFERRED EMBODIMENTS

First Embodiment

Figure 1:
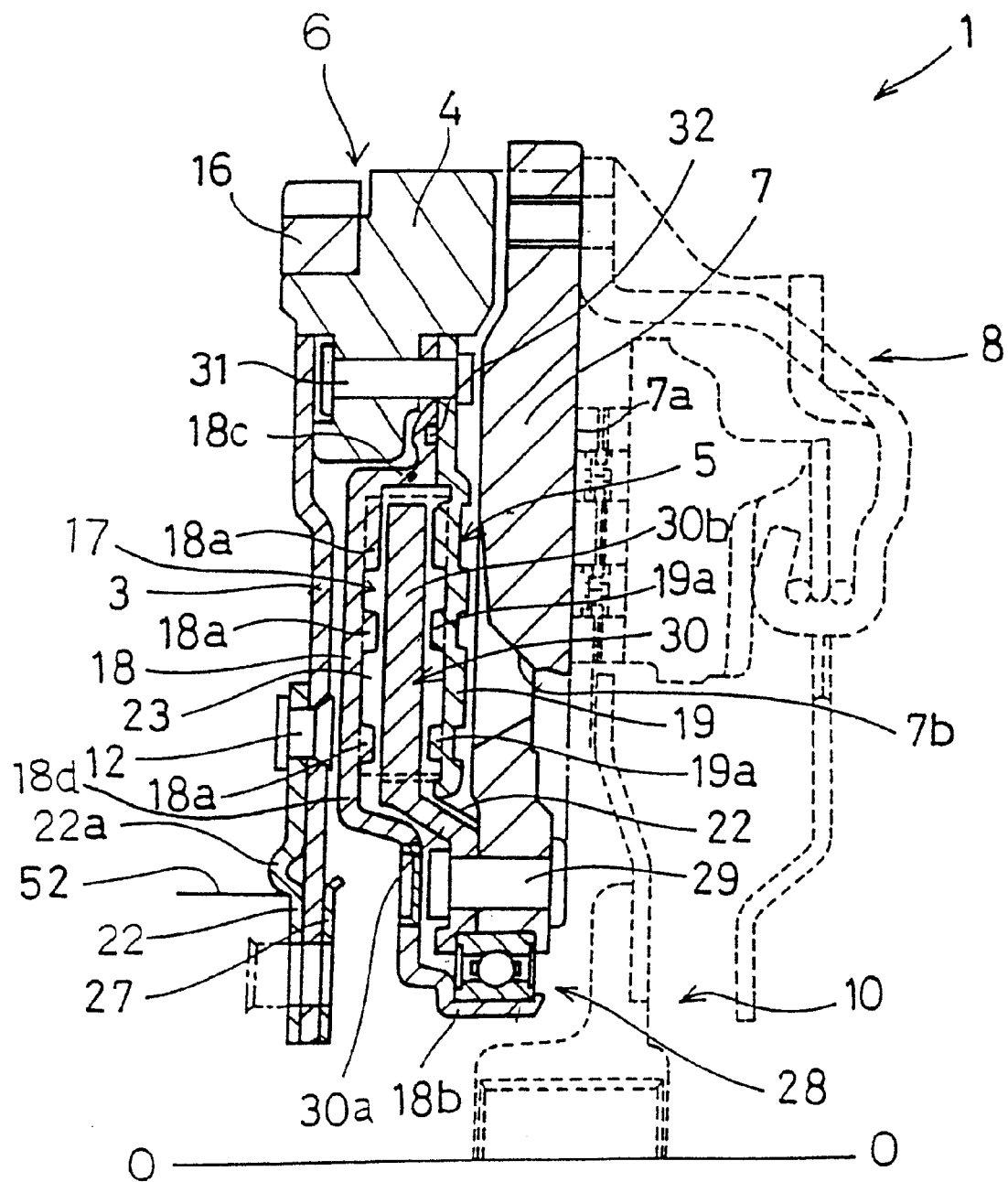
FIG. 1 is a fragmentary, schematic cross section of a flywheel assembly in accordance with a first embodiment of the invention wherein an annular chamber is filled with a dry lubricant.
Figure 2:
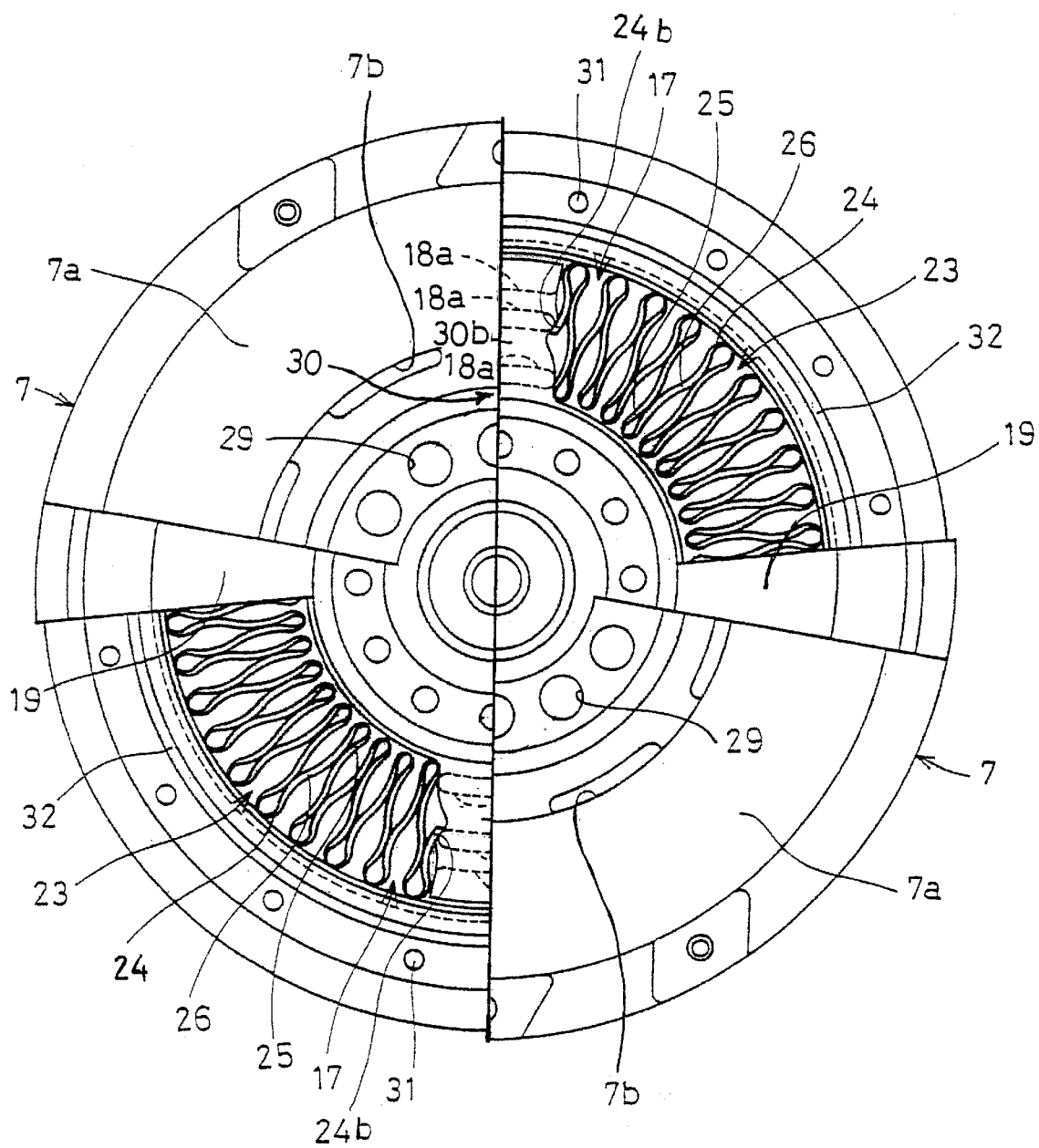
FIG. 2 is a fragmentary, multiple cutaway, end view of the flywheel assembly depicted in FIG. 1, showing an undulated spring in the annular chamber, the annular chamber also being filled with the dry lubricant.

A clutch device 1 in accordance with a first embodiment of the invention shown in FIGS. 1 and 2 primarily has a flexible plate 3, a first flywheel 4, a viscous damper mechanism 5 and a second flywheel 7, which form a flywheel assembly 6, as well as a clutch cover assembly 8 and a clutch disk assembly 10. An engine (not shown) is arranged at the left side of FIG. 1, and a transmission (not shown) is arranged at the right side.

The flexible plate 3 is an annular plate, and has a high rigidity in the circumferential direction but is flexible in axial or bending directions. An annular plate member 22 is fixed to an inner peripheral portion of the side of the flexible plate 3 near the engine by rivets 12. The plate member 22 has an annular drawn portion 22a which is in contact with an outer periphery of an end of a crank shaft 52. The drawn portions 22a helps to improve accuracy in centering of the flexible plate 3 on a crankshaft 52. An inner peripheral portion of the flexible plate 3 is fixed together with the plate member 22 and a washer 27 to the crankshaft 52 of the engine by bolts (not shown).

A first annular flywheel 4 is fixed to the radially outer end of the flexible plate 3 by rivets (not shown). A ring gear 16 is fixed to the radially outer portion of the first flywheel 4.

The viscous damper mechanism 5 is primarily formed of a first input plate 18, a second input plate 19, a pair of undulated plate springs 23 and a driven member 30. Although only a portion of one undulated plate spring 23 is shown in FIG. 2, it should be understood that in an embodiment where two undulated plate springs 23 are employed, each undulated plate spring 23 having an arcuate shape, each undulated plate spring 23 extends within the flywheel assembly 6 an arc of under 180°. With a greater number of springs 23, the arc length decreases accordingly.

The first input plate 18 is annular and is disposed adjacent to the flexible plate 3. The first input plate 18 is provided at its radially inner periphery with an inner peripheral projection 18b extending toward the transmission, and an outer peripheral projection 18c. The first input plate 18 is provided at its radially middle portion with an annular disk-like portion 18d which extends radially outwardly, as shown in FIG. 1. The second input plate 19 is annular and is disposed beside the first input plate 18. The outer peripheral portion 18c of the first input plate 18 and second input plate 19 are in contact with each other, and are fixed to the first flywheel 4 by rivets 31, as shown in FIG. 1. A seal ring 32 is interposed between the outer peripheral portions of the first and second input plates 18 and 19. The second input plate 19 has an inner diameter larger than an inner diameter of the first input plate 18.

An annular space is defined between the annular disk-like portion 18d of the first input plate 18 and the second input plate 19 forming a spring chamber 17.

The driven member 30 has a annular portion 30a and a pair of engagement portions 30b which extends integrally and radially outward from the annular plate portion 30a. The engagement portions 30b are arranged at diametrically opposed positions, and extend into the spring chamber 17. The first and second input plates 18 and 19 have axially projected support portions 18a and 19a, respectively. The support portions 18a are arranged at three radially spaced apart positions and extend circumferentially, respectively. Likewise, the support portions 19a are arranged at three radially spaced positions and extend circumferentially, respectively.

Owing to the above structure, the annular spring chamber 17 is divided into two arc-shaped sub-chambers by the support portions 18a and 19a, with one undulated spring 23 in each of the two arc-shaped sub-chambers.

Figure 3:
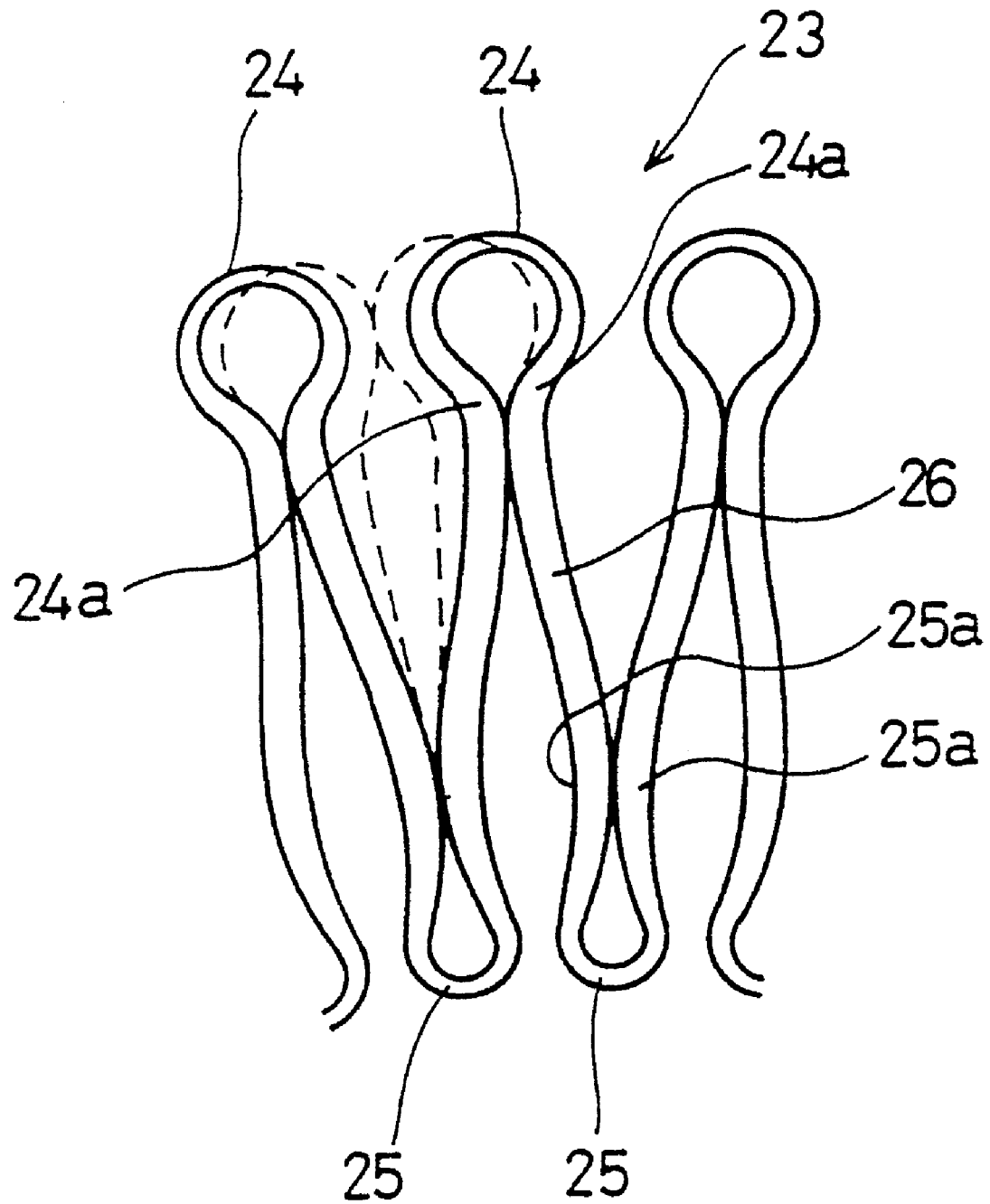
FIG. 3 is a fragmentary plan view of the undulated plate spring depicted in FIG. 2, shown removed from the flywheel assembly depicted in FIGS. 1 and 2.

Description will be given on the undulated plate spring 23 arranged in each arc-shaped sub-chamber of the annular spring chamber 17. As shown in FIGS. 2 and 3, each undulated plate spring 23 is formed of a corrugated plate having a predetermined axial width, and has a plurality of plate elements formed of ring portions 24 and 25 as well as lever portions 26. The radially outer ring portions 24 and the radially inner ring portions 25 are arranged alternately to each other, and each have open ends which are circumferentially spaced from each other and are located at the side opposed to the other kind of (i.e., radially inner or outer) ring portion. Each end of the ring portion is connected to the end of the radially opposed ring portion by the lever portion 26. The adjacent lever portions 26 extend in a diverging manner from the ends of the same ring portion 24 or 25. Each of the ring portions 24 and 25 has non-uniform cross-section such that the thickness of each of the ring portions 24 gradually decreases as one moves radially outward toward the radial edge of the ring portion 24, and likewise, the thickness of each of the ring portions 25 gradually decreases as one moves radially inward toward the radial edge of the ring portion 25. Therefore, the ring portions 24 and 25 have a lower rigidity than the lever portion 26. The radially outer ring portion 24 has a larger diameter than the radially inner ring portion 25. The radially outer ring portions 24 are slidable on the outer peripheral wall 18c.

Circumferentially opposite ends 24b of the undulated plate spring 23 are in contact with the engagement portions 30b and the circumferential ends of the support portions 18a and 19a.

The spring chamber 17 is filled with powder solid lubricant made of, for instance, molybdenum disulfide. The powder solid lubricant is mixed with air and therefore is suspended in air within the spring chamber 17. The powder solid lubricant readily adheres to the surface of the wall of the spring chamber 17, i.e., the surfaces of the first and second input plates 18 and 19, the driven member 30 and the undulated plate spring 23, and lubricates respective sliding portions.

The radially outer surfaces of the ring portions 24 of each undulated plate spring 23 contact the inner radial surface of the spring chamber 17 (the inner surface of the outer peripheral wall 18c) defining a friction generating mechanism which produces a small level of hysterisis torque. The level of hysterisis torque is low because if the presence of the powder solid lubricant, but is great enough to assist in the dampening of vibrations.

The powder solid lubricant filling the damper mechanism requires the following properties.

(1) Low friction coefficient and good lubricity.
(2) Good absorption properties with respect to members (metal). for instance, the solid lubricant is readily absorbed into the surface of the metallic members.
(3) Large adhesive force to members after absorption. Since the powder solid lubricant is always present on the sliding portion, the lubricity can be maintained for a long term.
(4) Lightweight and dispersible.
(5) Low self-condensability.
(6) High heat resistance.
(7) Not hazardous substance.

FIG. 4 shows the characteristics of a variety of solid lubricants, all of which may be used in the present invention. However, based on characteristics in FIG. 4, it can be understood that the molybdenum disulfide can be employed most preferably as the solid lubricant in view of good absorptive properties and large adhesive force. Further, the molybdenum disulfide can be used under a high load, and is inexpensive. Tungsten disulfide is second most preferable substance.

The second flywheel 7 has an annular friction surface 7a opposed to the transmission. The second flywheel 7 has communication apertures 7b extending between the opposite surfaces. The annular portion 30a of the driven member 30 is fixed to the radially inner portion of the second flywheel 7 by rivets 29. Inner peripheries of the second flywheel 7 and the driven member 30 are carried by the inner peripheral projection 18b of the first input plate 18 through a bearing 28. The bearing 28 is of a lubricant-sealed type, and provides a seal between the inner peripheral portion of the first input plate 18 and the inner peripheries of the driven member 30 and the second flywheel 7.

The clutch cover assembly 8 is adjacent to the friction surface 7a of the second flywheel 7. The clutch disk assembly 10 is disposed between the second flywheel 7 and the clutch cover 8. The clutch disk assembly 10 is coupled to a transmission input shaft (not shown).

An operation will be described below.

A torque is transmitted from the crankshaft 52 of the engine to the first flywheel 4 through the flexible plate 3, and then is transmitted through the viscous damper mechanism 5 to the output plate and the second flywheel 7. When a torsional vibration is supplied to the viscous damper mechanism 5, the first and second input plates 18 and 19 cyclically rotate relatively to the driven member 30, and the undulated plate springs 23 are circumferentially compressed. Thereby, the divergence angle of the paired levers 26 decreases, and the ring portions 24 and 25 as well as the lever portions 26 bend in the same direction around fulcrums formed of the circumferentially outer portions of the ring portions 24 and 25 of the undulated plate springs 23. A low rigidity is exhibited in this operation.

When the relative rotation angle increases, the ends 24a and 25a of each of the ring portions 24 and 25 are brought into contact with each other, and thereafter, the ring portions 24 and 25 are elastically deformed around fulcrums defined by the ends 24a and 25a. A high rigidity is exhibited in this operation.

When the radially outer ring portions 24 are brought into contact with each other, and the radially inner ring portions 25 are brought into contact with each other as represented by broken line in FIG. 3, compression of the undulated plate spring 23 stops. More specifically, the first and second input plates 18 and 19 will not rotate relatively to the driven member 30. Thus, both the ring portions 24 and 25 function as a stop mechanism of the damper mechanism 5. As a result, a load larger than a set or intended load is unlikely to be exerted on the undulated plate springs 23, and thus generation of a large stress is suppressed. In particular, it is not necessary to provide an additional stop member, such as a stop pin, in the damper mechanism 5, because the undulated plate spring 23 itself functions as a stop mechanism in the damper mechanism 5. Therefore, the structure of the present invention is simpler than the prior art.

When the first and second input plates 18 and 19 rotate relatively to the driven member 30 as described above, a centrifugal force moves the undulated plate spring 23 radially outward, so that the radially outer ring portions 24 slide on the outer peripheral wall 18c to cause a friction. The amount of friction produced by the engagement between the undulated plate spring 23 and the outer peripheral wall 18c is sufficient to produce a hysterisis effect which assists in dampening vibrations. However, wearing or abrasion of the radially outer ring portions 24 and the outer peripheral wall 18c is suppressed owing to adhesion of the powder solid lubricant. Also, the friction does not occur to an excessively large extent. Wearing is also suppressed at the sliding portions of the opposite ends of the undulated plate springs 23 and the engagement portions 30 and the support portions 18a and 19a because the powder solid lubricant also lubricates these portions.

Since the powder solid lubricant has a high adhesion, it provides a sealing function when adhered to surfaces adjacent to a gap or crack, such as the seam between the radially outer portions of the first and second input plates 18 and 19. Therefore, powder solid lubricant does not leak from the spring chamber 17, and thus maintenance such as refilling is not required.

The damper mechanism may be employed in a device other than the flywheel assembly. For example, it may be employed in a clutch disk assembly or a lockup clutch of a torque converter.

The solid lubricant may be made of a material other than those in the above embodiment. Two or more kinds of solid lubricant may be used in a mixed form.

Second Embodiment

Figure 5:
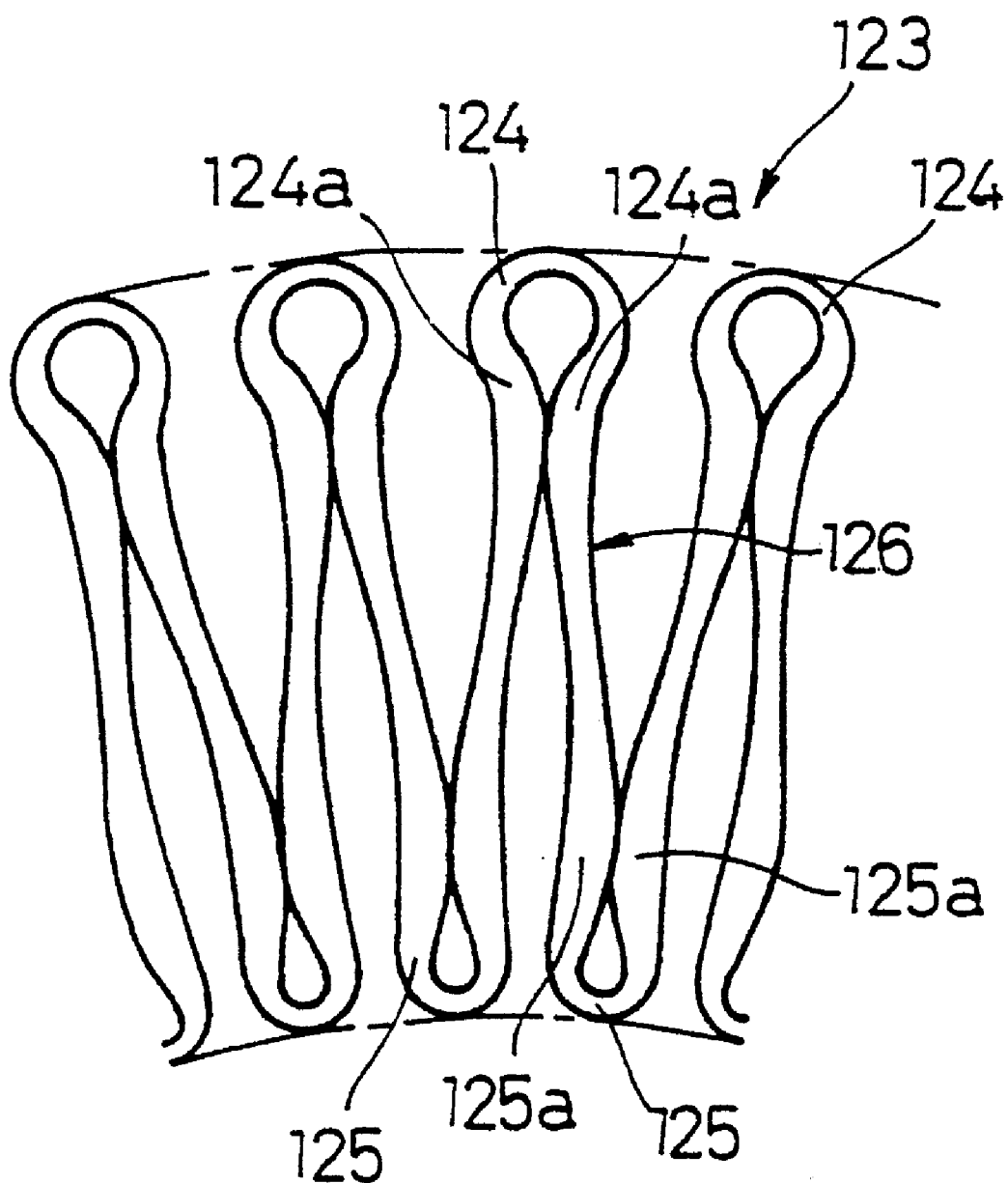
FIG. 5 is a fragmentary plan view, similar to FIG. 3, showing an undulated plate spring in accordance with a second embodiment of the present invention.

The undulated plate spring 123 of another form will be described below. As shown in FIG. 5, the undulated plate spring 123 is formed of a corrugated plate having a predetermined width, and has a plurality of spring elements, which are arranged in series and each are formed of the ring portions 124 and 125 and the lever portion 126.

The radially outer and inner ring portions 124 and 125 are arranged alternately, and each is provided at its side opposed to the other kind of ring portions 125 or 124 with ends 124a or 125a forming a circumferentially small space or opening. The ends 124a and 125a are mutually connected together by the lever portions 126. Each of the ring portions 124 and 125 has a non uniform cross-section because a thickness gradually decreases as one's position moves toward the radial edge thereof. Therefore, the ring portions 124 and 125 have a lower rigidity than the lever portion 126. The radially outer ring portion 124 has a larger diameter than the radially inner ring portion 125. The outer ring portion 124 is slidable on the outer peripheral wall 18c (FIG. 1).

The paired lever portions 126 diverges from the ends of the common ring portion 124 or 125. The lever portion 126 has a thickness which gradually decreases as the position moves from each end toward the middle portion. Thus, the middle portion of the lever portion 126 is thinner than the opposite ends.

When a torsional vibration is supplied to the damper mechanism 5, the first and second input plates 18 and 19 cyclically rotate relatively to the driven member 30, and the undulated plate springs 123 are circumferentially compressed. Thereby, the divergence angle of the paired levers 126 decreases, and the ring portions 124 and 125 as well as the lever portions 126 bend in the same direction around fulcrums formed of the circumferentially central portions of the ring portions 124 and 125 of the undulated plate springs 123. A low rigidity is exhibited in this operation.

When the relative rotation angle increases, the ends 124a and 125a of each of the ring portions 124 and 125 are brought into contact with each other, and thereafter, the ring portions 124 and 125 are elastically deformed around fulcrums defined by the ends 124a and 125a. A high rigidity is exhibited in this operation.

The plurality of ring portions 124 and 125 store the elastic energy in a dispersed or distributed manner. In particular, each ring portion 124 or 125 can be easily deformed elastically, because it has a low rigidity at the central (apex) portion. Accordingly, the plurality of ring portions 124 and 125 have a large capacity of storing the elastic energy. Further, the lever portion 126, which has a smaller thickness at the central portion than the opposite ends, has a small rigidity, so that it can be easily deformed elastically. Consequently, the lever portions 126 have a high capacity of storing the elastic energy.

Third Embodiment

Figure 6:
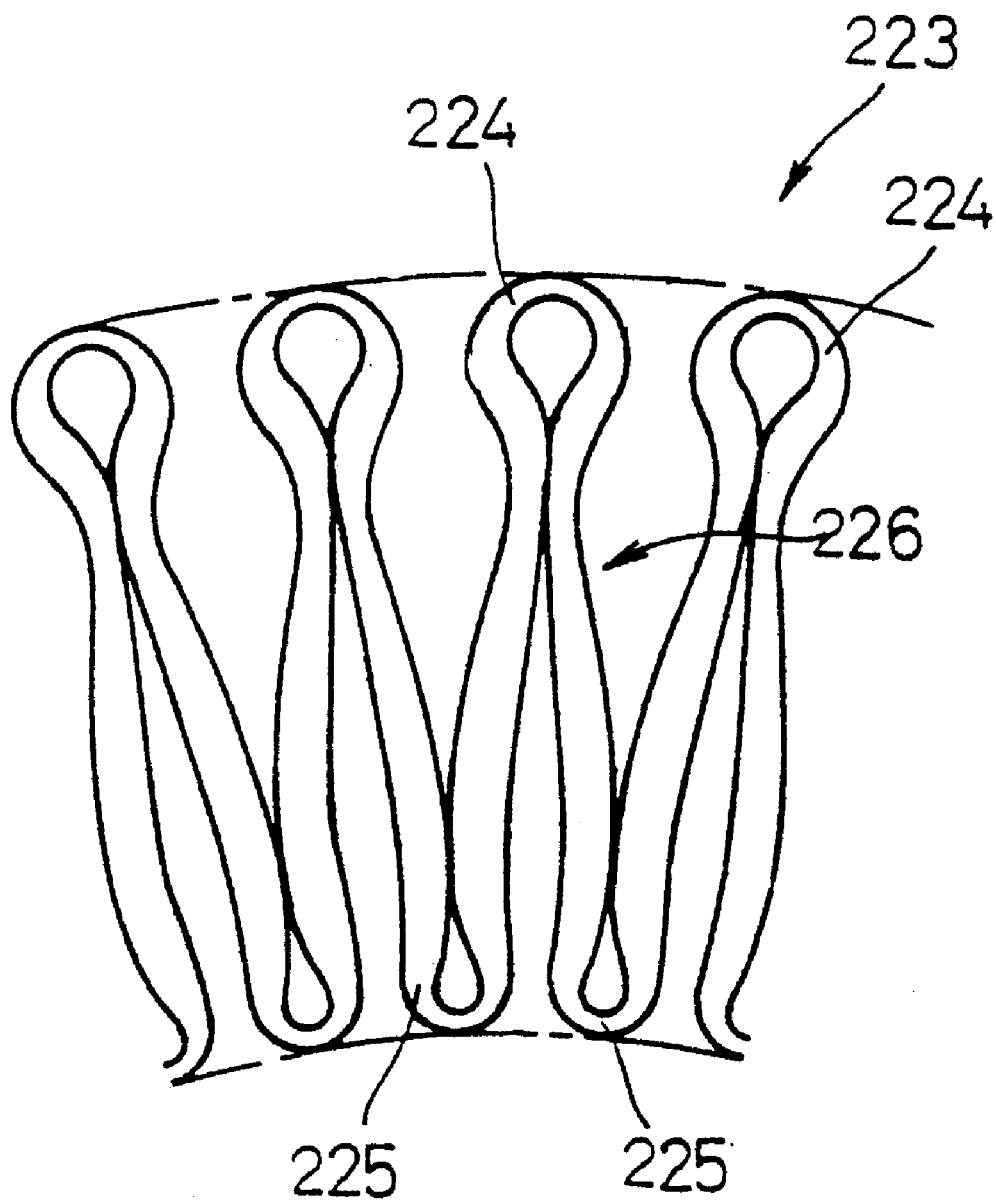
FIG. 6 is a fragmentary plan view, similar to FIGS. 3 and 5, showing an undulated plate spring in accordance with a third embodiment of the present invention.

In a third embodiment of the present invention, as shown in FIG. 6, the end of the lever portion 226 near the radially outer ring portion 224 is thinner than the end near the radially inner ring portion 225. This reduces the rigidity of the lever portion 226, and the lever portion 226 can have an improved capacity of storing the elastic energy.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A damper mechanism comprising:
   an input member;
   an output member configured for limited relative rotary displacement with respect to said input member;
   a chamber housing disposed between said input and output members, a first portion of said chamber housing connected to said input member for rotation therewith;
   an undulated plate spring disposed in said chamber housing elastically connecting said input and output members for limited relative rotary displacement therebetween and damping torsional vibration therebetween, said undulated plate spring being compressible in response to relative rotary displacement between said input and output members, radially outer portions of said undulated plate spring contacting an inner radial surface of said chamber housing thereby defining a hysteresis vibration dampening mechanism whereby, in response to relative rotary displacement between said input and output members, contact between said radially outer portions of said spring and said inner radial surface of said chamber housing generates friction; and
   a powder solid lubricant disposed in said chamber housing providing lubrication between said spring and said surface of said chamber housing to augment the operation of the hysteresis vibration dampening mechanism and also to reduce wear on other portions of said spring that may contact said chamber,
   said undulated plate spring comprising a row of radially outer ring portions, a row of radially inner ring portions, and a plurality of lever portions, said rows of radially inner and outer ring portions each having open ends that are radially opposed to one another, said lever portions connecting together said open ends of said rows of radially inner and outer ring portions, said lever portions decreasing in thickness as a position on said lever portions moves from said open ends of said rows of said inner and outer ring portions toward middle portions of said lever portions.

2. The damper mechanism as set forth in claim 1, wherein said powder solid lubricant is made of molybdenum disulfide.

3. The damper mechanism as set forth in claim 1, wherein said powder solid lubricant is made of tungsten disulfide.

4. The damper mechanism as set forth in claim 1, wherein said input member includes first and second input plates and said output member is a driven member.

5. The damper mechanism as set forth in claim 4, wherein said chamber housing is formed from said first and second input plates shaped to form an annular chamber in said chamber housing, said undulated plate spring being disposed in said annular chamber.

6. The damper mechanism as set forth in claim 5, wherein said annular chamber is provided on inner surfaces with two sets of opposing protrusions, said protrusions dividing said annular chamber into at least two sub-chambers, each of said sub-chambers having said undulated plate spring disposed therein, a portion of said undulated plate spring engaging said opposing protrusions.

7. A damper mechanism adapted to be coupled between first and second flywheels, the first flywheel being coupled to an engine via a flexible plate, said damper mechanism comprising:
   an input member;
   an output member configured for limited relative rotary displacement with respect to said input member;
   a chamber housing disposed between said input and output members, a first portion of said chamber housing connected to said input member for rotation therewith;
   an undulated plate spring disposed in said chamber housing elastically connecting said input and output members for limited relative rotary displacement therebetween and damping torsional vibration therebetween, said undulated plate spring being compressible in response to relative rotary displacement between said input and output members, radially outer portions of said undulated plate sp ring contacting an inner radial surface of said chamber housing thereby defining a hysteresis vibration dampening mechanism whereby, in response to relative rotary displacement between said input and output members, contact between said radially outer portions of said spring and said inner radial surface of said chamber housing generates friction; and a powder solid lubricant disposed in said chamber housing providing lubrication between said spring and said surface of said chamber housing to augment the operation of the hysteresis vibration dampening mechanism and also to reduce wear on other portions of said spring that may contact said chamber, said undulated plate spring comprising a row of radially outer ring portions, a row of radially inner ring portions radially opposed to said row of radially outer ring portions, and a plurality of lever portions connecting together said rows of radially inner and outer ring portions, said lever portions having a higher rigidity than said rows of radially inner and outer ring portions, said lever portions each having a radially outer end and a radially inner end, said radially outer end having a thinner thickness than said radially inner end.

8. The damper mechanism as set forth in claim 7, wherein said powder solid lubricant is made of molybdenum disulfide.

9. The damper mechanism as set forth in claim 7, wherein said powder solid lubricant is made of tungsten disulfide.

10. The damper mechanism as set forth in claim 7, wherein said input member includes first and second input plates and said output member is a driven member.

11. The damper mechanism as set forth in claim 10, wherein said chamber housing is formed from said first and second input plates shaped to form an annular chamber in said chamber housing, said undulated plate spring being disposed in said annular chamber.

12. The damper mechanism as set forth in claim 11, wherein said annular chamber is provided on inner surfaces with two sets of opposing protrusions, said protrusions dividing said annular chamber into at least two sub-chambers, each of said sub-chambers having said undulated plate spring disposed therein, a portion of said undulated plate spring engaging said opposing protrusions.

* * * * *